M. D. AVERY.
APPARATUS FOR THE PURIFICATION OF WATER AND OTHER LIQUIDS.
APPLICATION FILED JULY 1, 1912.
1,066,570.
Patented July 8, 1913.
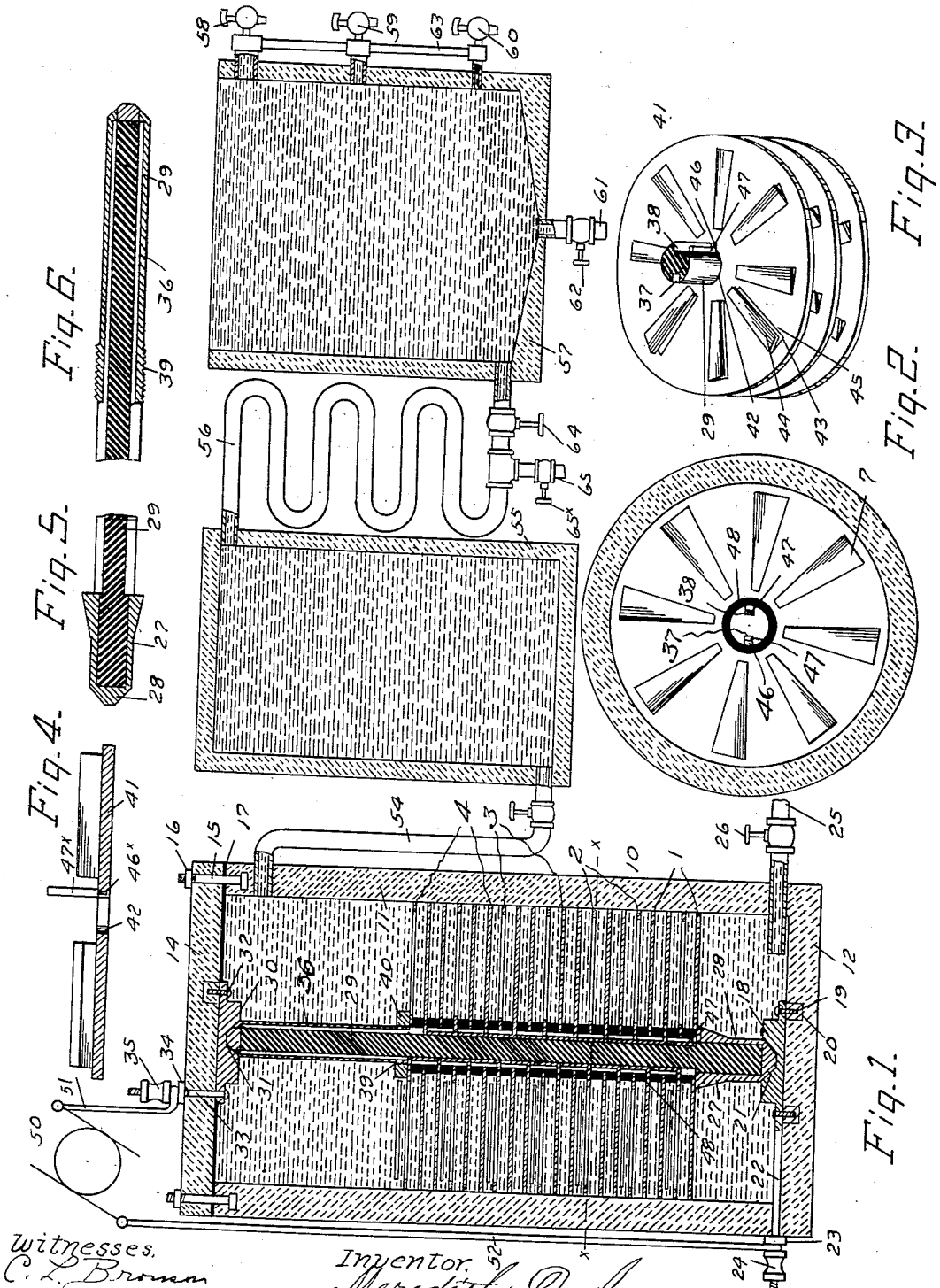

UNITED STATES PATENT OFFICE.

MEREDITH D. AVERY, OF KANSAS CITY, MISSOURI.

APPARATUS FOR THE PURIFICATION OF WATER AND OTHER LIQUIDS.

1,066,570.   Specification of Letters Patent.   Patented July 8, 1913.

Application filed July 1, 1912. Serial No. 707,044.

*To all whom it may concern:*

Be it known that I, MEREDITH D. AVERY, a citizen of the United States of America, residing at Kansas City, in the county of Jackson and State of Missouri, have invented certain new and useful Improvements in Apparatus for the Purification of Water and other Liquids; and I do hereby declare that the following is a full, clear, and exact description of the invention, reference being had to the accompanying drawings, forming a part of this specification.

The invention relates to certain novel improvements in apparatus for the purification and defecation of liquids, such as potable or contaminated waters, either hard or soft, sewage in which purification is an important factor and also for the purification and clarification of saccharine juices, such as that of the sugar cane, sugar beet or other vegetables of a saccharine nature, and also to the waters employed in the arts wherein the solutions are charged with chemical substances and of various colors.

The object of the invention is to produce a hydrolyzed condition of the liquid, wherein the impurities in the solution are caused to selectively attack the electrodes, and in forming coagula by the attack of the hydroxids formed, upon the compounds in the liquid. Second, to provide greater surface contact of the ions in the liquids with the electrodes.

The invention consists in the novel apparatus, as constructed and combined and as hereinafter more fully described and specifically pointed out in the annexed claims, reference being had to the accompanying drawings forming a part of this specification, in which like reference characters indicate corresponding parts in all the figures of the drawing.

In the drawing, Figure 1, is a vertical, sectional view of the complete apparatus embodying the invention. Fig. 2, is a transverse sectional view taken through the main receiving tank on the line $x$ $x$, on Fig. 1, showing in plan the rotatable electrodes and pole contacts for the alternate electrodes. Fig. 3, is a detail view in perspective of a series of the electrodes showing a sectional portion of the insulated supporting post. Fig. 4, is a vertical sectional view taken through the central portion of one of the electrodes, showing one of the contact posts. Fig. 5, is a detail sectional view of a portion of the insulated, rotatable post for the electrodes, and of the metallic shoe in which the post is stepped, and Fig. 6, is a longitudinal sectional view of the metallic sleeve on the upper end portion of the insulated post showing a portion of the post in section.

The main fluid receiving tank 10, in which the fluids are first treated is composed preferably of concrete, which not only being a non-conducting material is sanitary and readily made non-absorbent. The bottom 12, is integral with the sides 11, of the tank and the top 14, hermetically connected with the sides by means of the bolts 15, the heads of which are embedded in the concrete sides 11, the threaded portions of which pass through the top, and the nuts 16, in said bolts secure the top firmly upon the gasket 17, upon the said upper portions of the sides of the tank. The tank 10, as shown, is circular in cross section and upon the inner surface of the bottom 12, at a point equidistant from the inner surface of the side 11, is a metal block 18, of electrical conductivity, secured to the bottom 12, by means of screws 19, inserted in the plugs 20, in the concrete. In the block 18, is a cone shaped depression 21. With this block 18, is integrally connected a binding post 22, the outer end of which extends through the side 11, of the tank and screw threaded, and upon said end is a washer 23, and a binding screw 24. The main supply of the liquid to the tank is through a supply pipe 25, extending through the side of the tank upon a line horizontal with the upper surface of the bottom 12. In this pipe 25, is a fluid controlling and cut-off valve, 26.

In the cone shaped depression in the block 18, is mounted the lower cone shaped end 28, of a cylindrical cored piece or shoe 27, composed of metal and its upper end outwardly flared to serve as a support for the electrode. In this shoe is stepped the lower end of a circular post 29, composed of non conducting material preferably of wood. Upon the inner surface of the top 14, is a centrally positioned block 30, composed of metal of electrical conductivity, in which is a cone shaped depression 31. This block 30, is secured to the top by a screw 32, the opening therefor being plugged in the same manner as screws 19, in the block 18. A bolt 33, secures a portion of the block 30, to the top of and passes through the same and forms a binding post upon which is a washer 34, upon the outer surface of the cover. The bolt 33, is screw threaded and upon said bolt is a binding nut 35.

Upon the upper end of the post 29, is a metallic cylinder or sleeve 36, the upper end of which is beveled inwardly and extends to the cone shaped upper end of the said post 29, which end and the beveled upper end of the sleeve 36, is seated within the depression or seat 31, in the block 30, the sleeve 36, forming electrical contact with the said block.

In the surfaces of the post 29, in the line of the diameter of said post are vertical grooves 37, and 38, respectively, these grooves extending upwardly from the line of the upper surface of the shoe 27. The lower end of the sleeve 36, extends downwardly a short distance and upon the outer surface and lower end is an external screw thread 39, and a clamping screw 40, which acts as further described.

The electrodes 41, for the purposes of the invention, are composed of metal plates, circular in form and slightly smaller in circumference than that of the inner circumference of the tank 10. In the center of each plate is a circular opening 42, of the proper dimensions to receive the post 29. The plates composing the electrodes are each cut upon radial lines 43, extending to within short distances of the circumference of the plate and the opening 42. The plate is again cut, transversely, to the radial line 43, and extending from the line of segregation 43, adjacent the circumference of the plate a considerable distance, and from the point adjacent the opening 42, a less distance. The part of the plate thus cut is bent upwardly at an angle to the plate, similar to a fan or propeller blade as at 44, leaving beneath said portion 44, an opening 45, for the passage of the fluid and its action thereon, further referred to, a plurality of these blades and openings being formed in the plate composing the electrode at suitable distances apart in the circumferential direction of the plate.

Projections or lips 46, extend inwardly from the line of the sides of the openings 42, in each plate, and which extend within the grooves 37, and 38, respectively in the order in which the electrodes are assembled upon the post 29. As shown the lips are made to extend within the grooves, and the contact posts 47, removable and screw threaded and fitted within screw threaded openings 48, in the said lips or projections. The upper ends of these posts extend upwardly the requisite height to come into contact with the lower surfaces of these lips 49, in the alternate order of ascending series of the negative and positive electrodes. These electrodes comprise twenty plates in the order of groups, viz., 1, 2, 3, 4, there being four metal plates in the lowest group in the series, viz., group 1, four metal plates in the next group above group 1, viz., group 2, and six metal plates in the respective groups 3 and 4, above group 2, and are assembled on the post 29, in the following order and in their electro positive order of activity such as beginning at the bottom plate of the first group 1, comprises four metal plates, which are composed of copper. In the second group, comprising four metal plates, said plates are composed of iron. In the third group comprising six metal plates, said plates are composed of aluminum. In the fourth group, comprising six plates, said plates are composed of magnesium. These associated plates form in alternate order the series of anodes and cathodes which are placed for rotation within the closed tank 10, the lowest plate in the series being an anode, supported by the shoe 27, the post upon said anode extending upwardly within the groove 37. Upon the post 29, is then placed an insulating ring 48. Upon this ring is placed a cathode the contact post being extended within the groove 38. An insulating ring 48, is then placed on the post upon the upper surface of the cathode and then an anode is placed upon the ring which comes into contact with the post on the anode below, and next a cathode is set in place and in contact with the post in the groove 37, and thus continued, electrically connecting anodes and cathodes, alternately and selectively with each other, the complement of electrodes being a number of anodes and cathodes of different metals, the last in the ascending series being a cathode, and upon said cathode the clamping nut 40, in the sleeve 36, is turned so as to draw the plates closely together on the post 26, and cause the contact posts to be held in close electrical connection with the electrodes.

50, indicates the source of electrical energy, such as a dynamo from which extends a conducting wire 51, which is connected with the binding post 33, and conducts an energizing negative current to the electrodes. With the binding post 22, is connected the inner end of a conducting wire 52, the other end of which wire extends to the dynamo and carries the positive current.

Adjacent the main tank 10, is a hermetical charging tank 55, for the combined gases further alluded to, and is so elevated in position as to receive an overflow from the top of tank 10, into the bottom of tank 55, with a moderate degree of pressure, a liquid conducting pipe 54, being connected at one end with the upper portion of tank 10, and its lower end with the lower portion of the tank 55. Adjacent the tank 55, is a settling tank 57, this tank is open at the top, and with the upper portion of the tank 55, is connected with one end of a pipe 56, which consists of sinuous portions which bend inwardly and outwardly, its lower end being connected with the lower portion of the settling tank 57. The function of the pipe 56 is to afford a longer path of movement of the liquid charged with the gases.

With the upper portion of the tank 57, is connected a discharge cock 58, of a large capacity, and with the side of the tank at a point intermediate the top and bottom portions, is connected a discharge cock 59, smaller in capacity to the cock 58, and at the bottom of the tank is a discharge cock 60, of less capacity for discharge than the cock 59. In the lower portion of the tank is a discharge pipe 61, and a cut-off valve 62. Upon the side of the tank is a sight tube 63, connected with the upper and lower and intermediate cocks, by means of which cocks separation may be made of the liquid in the order of its purification.

In supplying the tank 10, with the liquid to be treated, this may be accomplished by the force of gravity or pump pressure, it being, however, a prerequisite in all treatments of the various liquids that an analytical test be made to determine its purity and hardness, whether temporary or permanent, to predetermine what association of anodes and cathodes are requisite to form the electrodes. Potable water is either temporarily hard, due to the presence of acid carbonates or so called bi-carbonates, usually of calcium or magnesium or both. The permanent hardness in water is due to the presence of sulfates, usually of the same metals as found in temporary hard water. Such compounds or any others found in potable water or sewage exist largely, not in a molecular condition but through the disassociating power of the water itself in the form of anions and cations, which are attracted to the respective anodes and cathodes selectively, it being well known that chemical salts in solution are disassociated or ionized and when energized electrodes are inserted into any such solution one set of ions, the anions, is attracted to the anodes, while the other, the cations, is attracted to the cathode. What takes place at the electrodes depends upon the character of the ions and the nature of the electrodes themselves. If the anode is such that the anions will attack it, disintegration follows, more or less rapidly, forming a salt of the metal or metals contained in the anode, and this goes into the solution. If the anode is of such character as not to be attacked by the anions then the water itself is decomposed by the anions forming nascent oxygen and chlorin or some other gas, depending upon the character of the liquid and of the ions.

The liquid after a determination of its qualities for treatment enters the tank 10, through the pipe 25, upon the opening of the valve 26, the liquid passing upwardly and through the openings 45 and act upon the blades 44, on the electrodes imparting a rotation automatically thereto and in unison, the liquid moving circuitously and affording a large area for the surface contact of the liquid.

An electric current from the dynamo 50, charges the anodes and cathodes positively and negatively, the metallic ions, cations being attracted to the cathodes and anions, non-metallic, are drawn to the anode.

In the order in which chemical action takes place upon the different metals, as the body of the liquid moves along, the copper anodes will yield in the presence of sulfates and bi-carbonates in the water, some sulfate and chlorid of copper, which would be largely hydrolyzed, but as explained, upon mixing with the alkaline products formed at the cathode, will produce hydroxids of copper, which precipitate as a coagulum. The copper carbonates will be somewhat hydrolyzed by the water, but mainly precipitated along with the hydroxid. The iron forms similar compounds, the carbonate being entirely hydrolyzed, increasing the coagulum, and improving its character, while the action of the iron anode tends to remove any copper from the solution. Since aluminum forms a weaker base than iron, its salts are more strongly hydrolyzed. The aluminum carbonate is completely hydrolyzed, forming hydroxid, and setting free carbon-dioxid, while the chlorid and sulfate which are formed partially hydrolyze, but serve mainly to re-act with the alkaline compounds formed at the cathode, and produce a greater amount of hydroxid as a very light, flocculent coagulum, and the action of the aluminum anode will remove all traces of the preceding metal from the solution. The magnesium, acting as an anode, will be more rapidly disintegrated than any of the other metals mentioned, as it is more soluble in acid radicals. The carbonate produced will be partially hydrolyzed, and changed into hydroxid, and the sulfate and chlorid, by mixing with the alkaline products of the cathode will be precipitated as a quite insoluble hydroxid, increasing to a considerable extent the coagulum. Furthermore, magnesium having the strongest solution pressure in the series, removes all traces of the preceding metals and poisonous or colored salts, such as those of copper and iron, by precipitating them in the metallic form.

In practice, it is found that when copper, or other similar metals are used, traces of the chemical compounds formed by the disintegration, may be left in the solution. By the use of aluminum or magnesium as anodes, as the last in the series, all these are removed, inasmuch as the magnesium or aluminum equivalents, which pass into the solution when the copper, iron or zinc is deposited, are entirely precipitated as hydroxid, the plurality of the aluminum and magnesium plates being found exceedingly efficient.

The electrolytic action depends upon what takes place at the cathodes. The cations upon losing their electric charge, as they do upon coming into contact with the cathodes, as a general proposition, decompose the water forming hydroxids, at the same time setting free the hydrogen. The hydroxids thus formed are brought into contact with the metallic salts produced at the anode, forming a coagulum which collects and removes the suspended impurities. At the cathodes the metals usually present in the water are not deposited thereon, but as soon as they have lost their charge, decompose the water and form an alkali. The alkali during the flow of the water is brought into contact with the injurious salt and products formed at the anode, and not being removed, they unite with each other to form a coagulum. The action of the anodes in my electrode is such that a compound of any one metal, in the series, will be deposited from the solution, by any one succeeding it. In illustration, aluminum will cause any zinc in solution to be deposited, there being always a corresponding amount of the metal higher up in the series, which goes into solution in place of the metal deposited. Any of the metals, as anodes, will be disintegrated in presence of chlorids, forming chlorids of the metals, aluminum, iron, etc. These compounds will be partially hydrolyzed, forming hydroxids and partially decomposed by the alkali formed at the cathode. With the presence of sulfates in the water the ultimate result will be the same as in the case of acid or normal carbonates, as in temporary hardness or in alkaline water. With the aluminum or certain others in the series of metals, in water containing carbonates, carbonates of the metals would be formed. These will be largely hydrolyzed by the water, setting free carbon dioxid, and precipitating the metals as hydroxids to form the coagulum. The free hydrogen which is given off at the cathodes becomes entangled in this coagulum and decreases its density and overcomes its specific gravity, whereby it reaches the surface of the liquid.

Chlorids in the water, such as river water and sewage, cause considerable chlorin to be disengaged, which serves to sterilize or disinfect the water and destroy organic life, or bacteria. If the anode is of such metal as would be attacked by the chlorin, at least a part of the chlorin would be consumed in dissolving the anode and the salt formed would be preliminary to the formation of the coagulum. In case the anode is of such character that it would not be attacked by the anions, a possibility in some potable waters, nascent oxygen is formed. The anions then decompose the water, setting free oxygen, which in the nascent state serves the same purpose as ozone, being a powerful agent in the oxidation or sterilization of organic impurities and other deleterious matter in the water. The water which has passed through the active electrodes and is charged with the confined gases, and passes from the tank 10, through the pipe 54, into the bottom of tank 55, and the accumulated gases so act upon the coagulum as to decrease its density, the hydrogen seeking affinity with oxygen or any mineral or earthy salts, which are not thrown down by the hydroxids in the presence of the electrodes, in the forming of the coagulum. The water is now passed from the closed tank 55, through the pipe 56, connected with the top of tank 55, into the bottom of the open settling tank 57, in which the insoluble matter at first rises to the top of the tank 57, and here the condition of the water or liquid, may be observed through sight tubes 63, connected with the cocks 58, 59, and 60, which cocks are connected with the upper and lower and intermediate portions of the tank, and are of large capacity at the top and decreasing in size downwardly, the lower cock 60 being the smaller in size. The flocculent matter remaining at the top is removed through the cock 58, and the liquid removed from the tank through cocks 59, and 60, in a purified condition, while the matter settled in the bottom of the tank is removed through the discharge pipe 61.

After the current of water ceases to flow into the tank 57, should any impurities or salts of a deleterious character be left in the solution, hydrolytic and chemical action will follow and all traces of such compounds removed due to the action of the compounds which have been formed in tank 10. The employment of anodes of different character, as specified, may produce coagula of different color, as in the formation of carbonates or hydroxids of copper, the former of which is hydrolyzed by the water and which may be wholly precipitated upon changing the polarity of the anodes and cathodes.

In my invention and in the series of metals named there is no galvanic action, the anodes and cathodes being of exactly the same metals in each series has this advantage that if left in a closed circuit within any source of current galvanic action does not go on as would be the case if the metals constituted a galvanic couple. Disintegration in this instance takes place at the anodes as fast as deposition at the cathode, the result being that the alkaline products of the cathode will entirely precipitate the decomposition products of the anode.

In the general treatment of liquids the invention is especially generic in the treatment of saccharine liquid, or as it is generally termed juice or liquor, to designate its source, such as for instance, cane juice from the sugar cane, beet juice from the sugar beet, in which we have carbon, oxygen and hydrogen. This juice or liquid is admitted to the tank 10, in the same manner as the water, and is treated in like manner, the electromotive series of metals being such as is necessary for the production of a coagula in water of temporary hardness. The juice of the cane is composed of glucose and sucrose and contains some acid, therefore the presence of acid carbonates or so called bicarbonates and the selection of such metals as magnesium and aluminum in the series described is preferred, the alkaline solution formed at the cathode, neutralizing the acids and the precipitates which are hydroxids form a coagulum of the insoluble matter. The glucose rises to the top in the active formation of hydrogen at the cathodes. The juice or liquor now passes into the closed tank 55, and is subjected to the action of the accumulated confined gases which clarify the juice for a longer duration of time. From the tank 55, the liquor or juice is passed through pipe 56 which affords the reagents still further action upon the liquid while within the coils of the pipe, then into the settling tank 57, in which the escaping gases carry to the top of the coagulum and at the proper time the now clarified juice is drawn off through the cocks from the tank in the stages of clarification.

When the tank 57, is filled with the liquid, the valve 64, is closed and the valve 65, in the pipe 56, opened thus making a continuous discharge for other uses, such as supplying other settling tanks. The inert matter in the settling tank 57, is removed through the pipe 61.

In the tanks 10, and 55, and 57, the liquid may be retained under pressure for any desired period or a continuous flow permitted, as desired. The disintegrating action of the anodes may be active or passive, according to the voltage of the electric current, it being within the province of the appended claims to make such changes in form and structure as may be found useful and desirable.

Having fully described my invention what I now claim as new and desire to secure by Letters Patent is,—

1. In an apparatus for purifying liquids by hydrolytic action, the combination with a tank of a rotary post composed of non conducting material within the tank and plates forming the electrodes mounted upon said post, and rotatable therewith, said plates having radial openings and blades for the propulsion thereof.

2. In an apparatus for purifying liquids by hydrolytic action, the combination with a tank of a revoluble vertically grooved post composed of non conducting material within the tank, and electrodes mounted upon said post and contacts or posts within said grooves, and electrically connecting the plates negatively and positively.

3. In an apparatus for purifying liquids by hydrolytic action, the combination with a tank for the liquid, of a rotary vertically grooved post composed of non conducting material, plates comprising the anodes and cathodes, having central openings and mounted on said post, and lips extending from the sides of said openings within the grooves in the post, and contact posts supported by said lips.

4. In an apparatus for purifying liquids by hydrolytic action, the combination with a tank for the liquid, of a rotatable post composed of non conducting material having vertical grooves, plates having central openings, and comprising the anodes and cathodes, in alternate positions upon said post, insulators between said plates, lips extending from the sides of the openings in the respective anodes and cathodes within the grooves in said post, and electric contact posts for dissimilar electrodes upon said lips.

5. In an apparatus for purifying liquids by hydrolytic action, the combination with a non-conducting closed tank for the liquid, of metallic blocks connected with the inner surfaces of the top and bottom of the tank, a metallic shoe rotatably seated in the block on the bottom of said tank, a post composed of non conducting material stepped in said shoe, and a sleeve on the upper end of said post, rotatably seated in the block on the top of said tank, and a series of plates forming the anodes and cathodes, having central openings, mounted on said post and supported by the metallic shoe, insulators between the plates, and electric contact posts for the separate plates, means on the sleeve for clamping the plates together in the series, and means for energizing the anodes and cathodes through the respective blocks.

6. In an apparatus for purifying liquids by hydrolytic action, the combination with a tank containing the liquid, of a series of revoluble apertured electrodes moved by a current of water and composed of electro positive metal plates.

MEREDITH D. AVERY.

Witnesses:
S. L. C. HASSON,
EDWARD E. NABER.